US008964170B2

(12) United States Patent
Kang et al.

(10) Patent No.: US 8,964,170 B2
(45) Date of Patent: Feb. 24, 2015

(54) SYSTEM AND METHOD FOR ASSESSING THE FLOW OF A FLUID

(71) Applicant: The Johns Hopkins University, Baltimore, MD (US)

(72) Inventors: Jin U. Kang, Ellicott City, MD (US); Xuan Liu, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 155 days.

(21) Appl. No.: 13/709,874

(22) Filed: Dec. 10, 2012

(65) Prior Publication Data

US 2014/0160462 A1    Jun. 12, 2014

(51) Int. Cl.
*G01P 5/26* (2006.01)

(52) U.S. Cl.
CPC .................................. *G01P 5/26* (2013.01)
USPC ............................. 356/28.5; 356/28

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

2007/0276269 A1* 11/2007 Yun et al. .................. 600/504
2012/0095354 A1* 4/2012 Dunn et al. ................ 600/504

FOREIGN PATENT DOCUMENTS

WO    WO-2008/002839 A2    1/2008
WO    WO-2008/124845 A2    10/2008

OTHER PUBLICATIONS

Chen et al., "Noninvasive imaging of in vivo blood flow velocity using optical Doppler tomography," Opt. Lett. 22, 1119-1121 (1997).
Liu et al., "Distortion-free freehand-scanning OCT implemented with real-time scanning speed variance correction," Opt. Express 20, 16567-16583 (Jul. 2012).
Liu et al., "Spectroscopic-speckle variance OCT for microvasculature detection and analysis," Biomed. Opt. Express 2, 2995-3009 (Nov. 2011).
Mariampillai et al., "Speckle variance detection of microvasculature using swept-source optical coherence tomography," Opt. Lett. 33, 1530-1532 (2008).
Ren et al., "Cerebral blood flow imaged with ultrahigh-resolution optical coherence angiography and Doppler tomography," Opt. Lett. 37, 1388-1390 (Apr. 2012).

* cited by examiner

*Primary Examiner* — Luke Ratcliffe
(74) *Attorney, Agent, or Firm* — Venable LLP; Henry J. Daley; Laura G. Remus

(57) ABSTRACT

A system for assessing the flow of a fluid. The system can include a light source, a fiber-optic system optically coupled to the light source, which is arranged to provide a reference beam and an observation beam, an optical detection system arranged to receive combined light from the reference beam and the observation beam and to provide detection signals, and a data processing system arranged to communicate with the optical detection system to receive the detection signals. The data processing system can be configured to use the detection signals to determine a speckle pattern corresponding to the fluid flow, wherein the speckle pattern includes a plurality of lines, and to calculate a correlation between adjacent lines perpendicular to the flow to determine at least one of a rate of the flow and a displacement of the flow.

19 Claims, 3 Drawing Sheets

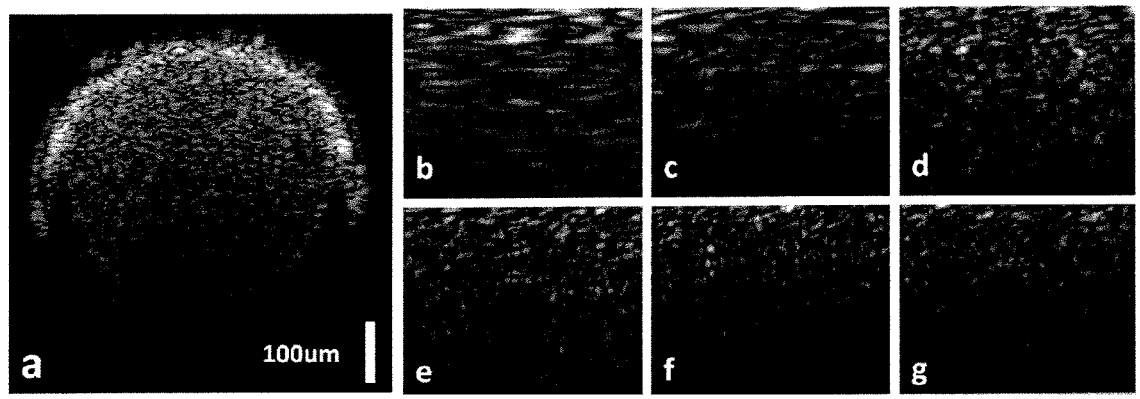
Figs. 2A-G
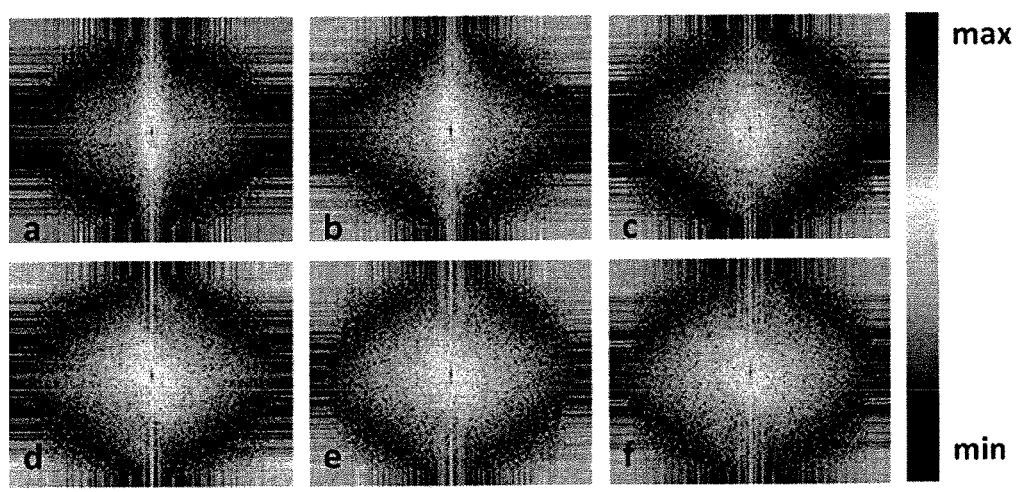
Figs. 3A-F

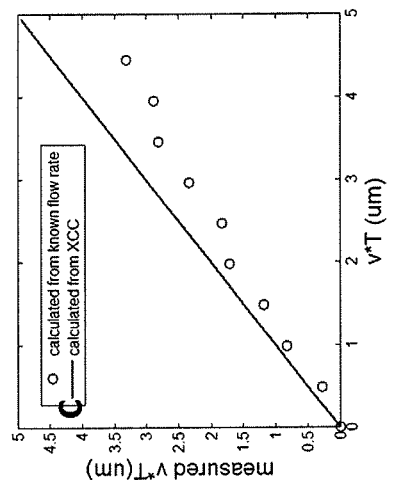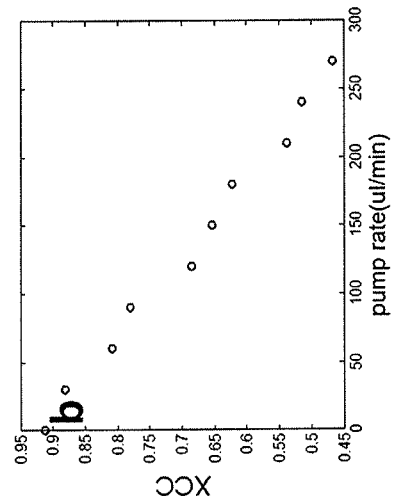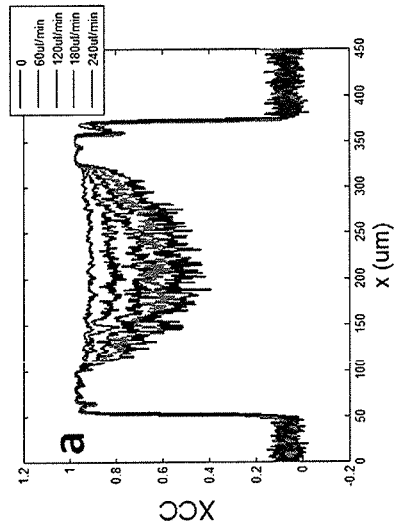
Figs. 4A-C

SYSTEM AND METHOD FOR ASSESSING THE FLOW OF A FLUID

FEDERAL FUNDING

This invention was made with Government support of Grants No. R01 EY021540 and BRP, 1R01 EB 007969-01, both awarded by the Department of Health and Human Services, The National Institutes of Health (NIH). The U.S. Government has certain rights in this invention.

BACKGROUND

1. Field of Invention

The field of the currently claimed embodiments of this invention relates to systems for assessing fluid flow, and more particularly to optical interferometry systems for assessing blood flow.

2. Discussion of Related Art

Various techniques exist in the art for measuring fluid flow, but each has its drawbacks. Doppler frequency shift and inter-frame speckle variance of optical coherence tomography (OCT) images have been used in blood flow detection [1, 2]. Optical coherence Doppler tomography (ODT) allows quantitative blood flow measurement; however, it is not able to measure flow in a plane that is normal to the imaging beam. Speckle variance OCT (svOCT) has higher sensitivity for the visualization of microvasculature; however, it is insensitive to the change of flow speed [3]. There thus remains a need for a technique for measuring fluid flow that is normal to the imaging beam and sensitive to the change of flow speed.

SUMMARY

According to some embodiments of the present invention, a system for assessing the flow of a fluid is disclosed. The system can include a light source, a fiber-optic system optically coupled to the light source, which is arranged to provide a reference beam and an observation beam, an optical detection system arranged to receive combined light from the reference beam and the observation beam and to provide detection signals, and a data processing system arranged to communicate with the optical detection system to receive the detection signals. The data processing system can be configured to use the detection signals to determine a speckle pattern corresponding to the fluid flow, wherein the speckle pattern includes a plurality of lines, and to calculate a correlation between adjacent lines perpendicular to the flow to determine at least one of a rate of the flow and a displacement of the flow.

According to an embodiment of the current invention, a method for assessing the flow of a fluid is disclosed. The method can include obtaining a speckle pattern corresponding to the flow using light interferometry, wherein the speckle pattern includes a plurality of lines, calculating a correlation between adjacent lines of the speckle pattern, and determining at least one of a rate of the flow and a displacement of the flow.

BRIEF DESCRIPTION OF THE DRAWINGS

Further objectives and advantages will become apparent from a consideration of the description, drawings, and examples.

FIGS. 2A-2G show (a) OCT image of flowing milk within a circular micro channel; (b)-(g) the same region of the Bscan at flow rate of 0, 60 µl/min, 120 µl/min, 180 µl/min, 240 µl/min and 300 µl/min.

FIGS. 3A-3F show power spectral density of regions of interest shown in FIGS. 2B-G.

FIGS. 4A-4C show (a) lateral profile of ρ at different flow rates; (b) ρ obtained from the central part of the micro channel; (c) displacement calculated from the pump rate (black line) and from ρ.

DETAILED DESCRIPTION

Some embodiments of the current invention are discussed in detail below. In describing embodiments, specific tell sinology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

According to an embodiment of the current invention, a system for assessing the flow of a fluid is disclosed. In this embodiment, the system can include a light source, a fiber-optic system optically coupled to the light source which is arranged to provide a reference beam and an observation beam, an optical detection system arranged to receive combined light from the reference beam and the observation beam, and to provide detection signals, and a data processing system arranged receive the detection signals from the optical detection system. The data processing system can be configured to use the detected image to assess the flow velocity based on the degree of speckle de-correlation between adjacent A scan images and form 2-D map of the flow velocity.

According to a further embodiment of the current invention, a process for assessing the flow of a fluid is disclosed. In this embodiment, the process can include determining a speckle OCT image to assess the flow velocity based on the degree of speckle de-correlation between adjacent A scan images to form 2-D map of the flow velocity.

Figure 1A:
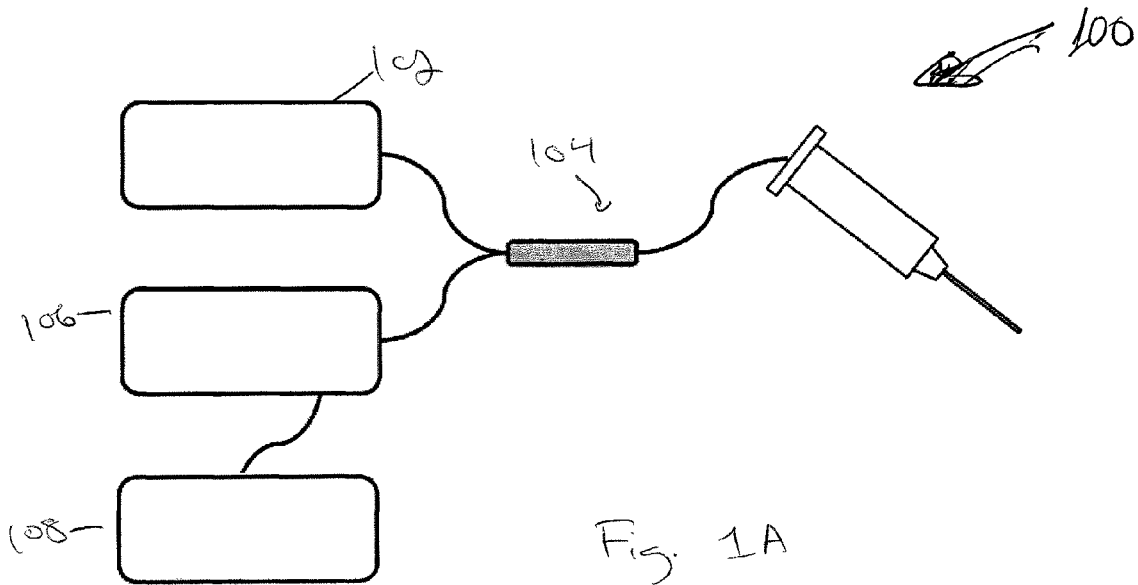
FIGS. 1A-1B show embodiments of a system for assessing the flow of a fluid.
Figure 1B:
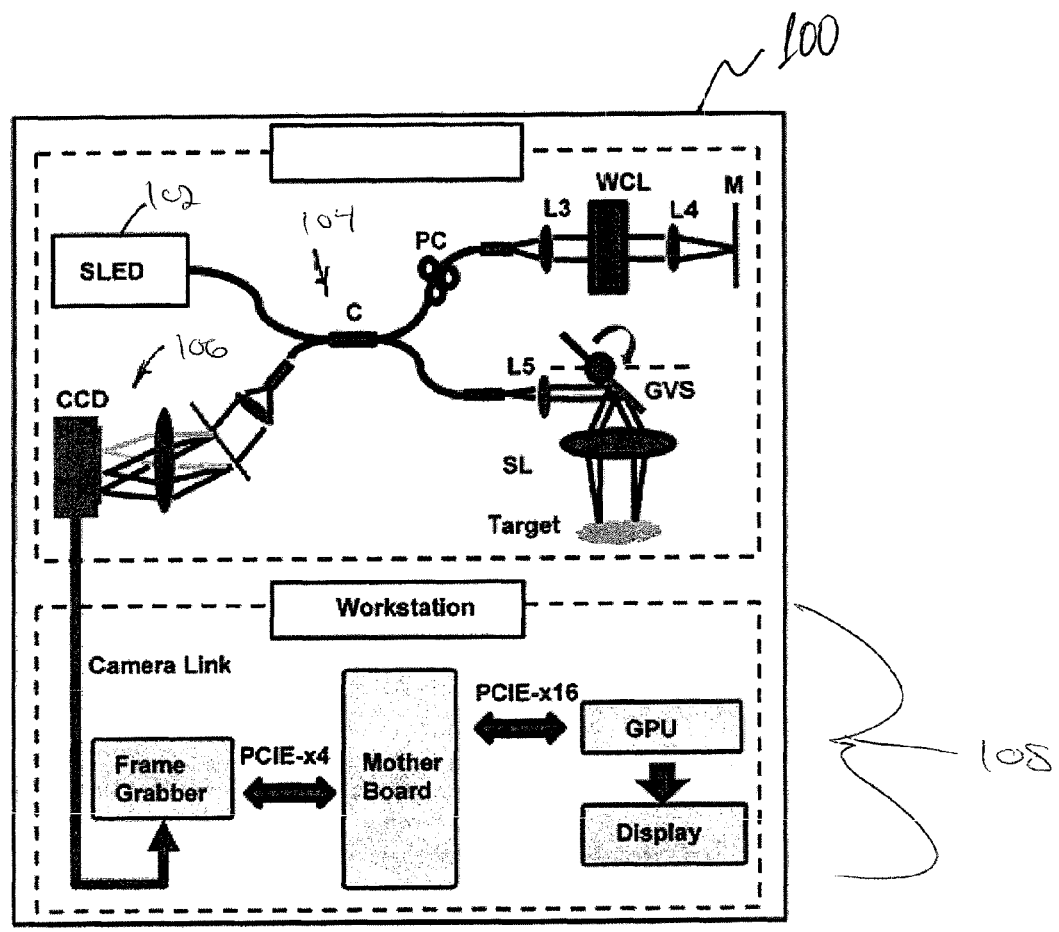

FIGS. 1A and 1B show example embodiments of a fluid flow assessment system 100. Fluid flow assessment system 100 can be a measurement system of any desired type, for example an optical interferometry system. Fluid flow assessment system 100 can include a light source 102. The terms "light" or "optical" as used herein are intended to have a broad meaning that can include both visible and non-visible regions of the electromagnetic spectrum. For example, visible, near infrared, infrared and ultraviolet light are all considered as being within the broad definition of the term "light." Light source 102 can provide any type of light as desired. In some embodiments, light source 102 can be, for example, a superluminescent (SLED) light source centering at 845 nm.

Fluid flow assessment system 100 can include a fiber optic system 104. Fiber optic system 104 can be optically coupled to light source 102, and can be arranged or otherwise configured to provide a reference beam and an observation beam. FIG. 1A shows an example of an embodiment in which the observation beam and the reference beam are provided along the same fiber optic path within fiber optic system 104. FIG. 1B shows an example of an embodiment in which the observation beam and the reference beam are provided along separate fiber optic paths within fiber optic system 104. Fluid flow assessment system 100 can be configured to provide the observation beam in any desired orientation relative to the direction of the fluid flow. For example, in some embodiments, fluid flow assessment system 100 can be effective while providing the observation beam in an orientation that is normal to the plane of the fluid flow.

Fluid flow assessment system 100 can also include optical detection system 106. Optical detection system 106 can be arranged or otherwise configured to receive combined light from the reference beam and observation beam of fiber optic system 104. Optical detection system 104 can also provide detection signals based on the combined light received from fiber optic system 104.

In some embodiments, fluid flow assessment system 100 can include a data processing system 108. The data processing system 108 can be a workstation, for example. However, the broad concepts of the current invention are not limited to this example. Other data processing systems could be sued according to the particular application. For example, the data processing system could be an application specific system, such as, but not limited to one or more ASICs and/or FPGAs. The data processing system could also be a personal computer, a laptop computer, a tablet computer, etc. It could also be a local or distributed computer, such as a computing system distributed over a local or wide area network, including the internet. The data processing system can also include one or more CPUs for running software and/or one or more graphics processing units (GPUs). In some embodiments, the data processing system 108 can perform computation functions for one or more components of the fluid flow assessment system 100.

In some embodiments, data processing system 108 can be configured to receive detection signals from fiber optic system 104 can use the detection signals to assess the fluid flow. Data processing system 108 can do so by using the detection signals to determine a plurality of intensity patterns corresponding to one or more positions in the flow at different times. Data processing system 108 can calculate a correlation between any desired number of A-scan images and use the correlation between them to provide an assessment of the flow. It should be noted that the broadest aspects of the invention are not limited, however, to A-scan images. These intensity patterns can take any desired form, for example optical coherence tomography A-scan images. This correlation can be any desired type of correlation, for example a Pearson cross-correlation coefficient, as described in greater detail below. This assessment can be any type of assessment as desired, for example a determination of a rate of the flow, a determination of a displacement of the flow, or any other type of assessment as desired. In some embodiments, for example, a decrease in the Pearson cross-correlation coefficient calculated between two or more intensity patterns can indicate an increase in the flow of the fluid.

In some embodiments, fluid flow assessment system 100 can be, for example, an optical coherence tomography (OCT) system. Fluid flow assessment system 100 can have any OCT characteristics as desired. For example, fluid flow assessment system can be a spatially encoded frequency domain OCT, a time encoded frequency domain OCT, a time domain OCT, or any other type of OCT as desired. In further exemplary embodiments, the detection signals provided by optical detection system 106 can be assembled by data processing system 108 into OCT A-Scan images.

In some embodiments, the position corresponding to the first intensity pattern and the position corresponding to the second intensity pattern can be located at different lateral locations in the flow. In further embodiments, these different lateral locations can be spaced so that the distance between adjacent lateral locations is smaller than the lateral resolution of fluid assessment system 100. For example, in some embodiments the distance between the different lateral locations can be approximately 0.6 μm, and the lateral resolution of fluid flow assessment system 100 can be approximately 12 μm. This can cause to be fluid flow to be oversampled, and intensity patterns corresponding to adjacent positions can be relatively well-correlated. In this way, a calculation of the correlation between speckle pattern corresponding to adjacent positions can provide useful information about, for example, the flow rate or displacement of the fluid flow. For example, in some embodiments the data processing system 108 can assemble a speckle pattern which can include a plurality of lines. The lines can, for example, correspond to different lateral locations within the flow. The data processing system can calculate the correlation between adjacent lines which are, for example, perpendicular to the flow.

Further additional concepts and embodiments of the current invention will be described by way of the following examples. However, the broad concepts of the current invention are not limited to these particular examples.

EXAMPLES

In the following examples, we demonstrate the use of inter-Ascan speckle decorrelation analysis of optical coherence tomography (OCT) images to assess flow. This method allows quantitative measurement of flow in a plane that is normal to the scanning beam. To validate this method, OCT images were obtained from a micro fluid channel with bovine milk flowing in it at different speeds. Results showed a close linear correlation between flow speeds extracted from our method and the pump rates, suggesting that the degree of correlation between Ascans can be used in quantitative flow measurement.

In this example, we used inter-Ascan speckle decorrelation to measure flow. The technique is based on our previous study which theoretically derived and experimentally verified the dependency of cross-correlation coefficient (XCC, ρ) between Ascans on displacement [4]. This method allows quantitative measurement of flow perpendicular to the scanning beam. To experimentally validate our method, we fabricated a 300 μm diameter micro flow channel with bovine milk flowing in it. A precision syringe pump was used to control the flow speed. Cross-sectional images of the micro flow channel were obtained using an OCT system operating at 845 nm with 70 kHz Ascan rate with a 0.6 μm lateral sampling interval. Results showed a close linear correlation between flow speeds extracted from our method and the pump rate, suggesting that cross correlation analysis between Ascans can be used in quantitative flow measurement.

Background Theory

As discussed in more detail in Reference (4), we previously we showed that the Pearson cross correlation coefficient (ρ) between Ascans can be used to estimate displacement.

When a simple hand-held OCT probe without mechanical scanner is scanned manually in x direction, the displacement between adjacent A-scans, Δx, is a function of the instantaneous scanning velocity v and the A-scan acquisition rate $f_A$, as shown in Eq (1).

$$\Delta x = \frac{v}{f_A} \tag{1}$$

v varies with time for a manual-scan OCT probe; $f_A$ is usually a constant for conventional data acquisition devices such as a frame grabber synchronized with an internal, periodical trigger signal. As a result, $\Delta x$ varies with time in the same manner as v. Therefore, the lateral intervals between different A-scans are different for manual scan.

According to Nyquist theorem, the sampling rate, R, has to be larger than twice the highest spatial frequency of the specimen ($F_n$): $R=1/\Delta x=f_A/v>2F_n$. Therefore, the scanning speed has to be smaller than $v_m$ shown in Eq (2).

$$v_m = \frac{f_A}{2F_n} \qquad (2)$$

Eq (2) also implies that a scanning velocity smaller than $v_m$ would lead to oversampling and information redundancy. Under the oversampling condition, there is correlation between adjacent A-scans. The degree of correlation can be measured by Pearson cross-correlation coefficient (XCC) shown as Eq (3).

$$\rho_{I_{x,y}(z),I_{x+\Delta x,y+\Delta y}(z+\Delta z)} = \qquad (3)$$

$$\frac{\langle [I_{x,y}(z) - \langle I_{x,y}(z)\rangle][I_{x+\Delta x,y+\Delta y}(z+\Delta z) - \langle I_{x+\Delta x,y+\Delta y}(z+\Delta z)\rangle]\rangle}{\sigma_{I_{x,y}(z)}\sigma_{I_{x+\Delta x,y+\Delta y}(z+\Delta z)}}$$

In Eq (3), < > indicates to take the mean value of a signal. Here $I_{x,y}(z)$ is the intensity of an A-scan at (x,y). $I_{x,y}(z)$ is calculated by taking the square of the amplitude of the A-scan. Denote the complex valued OCT signal as $S_{x,y}(z)$; then $I_{x,y}(z)=S_{x,y}(z)S^*_{x,y}(z)$. Similarly, $I_{x+\Delta x,y+\Delta y}(z+\Delta z)$ is the intensity of A-scan that is displaced by $(\Delta x,\Delta y,\Delta z)$. $\sigma_{I_{x,y}(z)}$ and $\sigma_{I_{x+\Delta x,y+\Delta y}(z+\Delta z)}$ are the square roots of variance for $I_{x,y}(z)$ and $I_{x+\Delta x,y+\Delta y}(z+\Delta z)$.

As we assume the scanning is in x direction, $\Delta y=\Delta z=0$, $I_{x+\Delta x,y+\Delta y}(z+\Delta z)$ becomes $I_{x+\Delta x,y}(z)$ and Eq (3) becomes:

$$\rho_{I_{x,y}(z),I_{x+\Delta x,y}(z)} = \frac{\langle [I_{x,y}(z) - \langle I_{x,y}(z)\rangle][I_{x+\Delta x,y}(z) - \langle I_{x+\Delta x,y}(z)\rangle]\rangle}{\sigma_{I_{x,y}(z)}\sigma_{I_{x+\Delta x,y}(z)}}$$

For simplicity, we use $\rho$ to denote $\rho_{I_{x,y}(z),I_{x+\Delta x,y}(z)}$ in subsequent equations.

If we assume the specimen has a homogeneous distribution of scatterers with a uniform scattering strength[19], e.g., the speckle is fully developed, the following relationship exist: $\langle I_{x,y}(z)\rangle=\langle I_{x+\Delta x,y}(z)\rangle=I_0$; $\langle I_{x,y}(z)^2\rangle=\langle I_{x+\Delta x,y}(z)^2\rangle=I_{RMS}^2$. Therefore, we have:

$$\sigma_{I_{x,y}(z)}^2 = \langle [I_{x,y}(z)-\langle I_{x,y}(z)\rangle]^2\rangle =$$
$$\langle I_{x,y}(z)^2\rangle - \langle I_{x,y}(z)\rangle^2 = I_{RMS}^2 - I_0^2$$

$$\sigma_{I_{x+\Delta x,y}(z)}^2 = \langle [I_{x+\Delta x,y}(z)-\langle I_{x+\Delta x,y}(z)\rangle]^2\rangle = \langle I_{x+\Delta x,y}(z)^2\rangle -$$
$$\langle I_{x+\Delta x,y}(z)\rangle^2 = I_{RMS}^2 - I_0^2$$

$$\langle [I_{x,y}(z)-\langle I_{x,y}(z)\rangle][I_{x+\Delta x,y}(z)-\langle I_{x+\Delta x,y}(z)\rangle]\rangle =$$
$$\langle I_{x,y}(z)I_{x+\Delta x,y}(z)\rangle - I_0^2$$

Based on the above relationships, we can simplify Eq. (3) to:

$$\rho = \frac{\langle I_{x,y}(z)I_{x+\Delta x,y}(z)\rangle - I_0^2}{I_{RMS}^2 - I_0^2}$$

Similar to ultrasound images with fully developed speckle, with the moment theorem for the jointly zero mean, Gaussian random variables, and assuming that the real and imaginary parts of S are uncorrelated, we have, $$\langle I_{x,y}(z)I_{x+\Delta x,y}(z)\rangle = |\langle S_{x,y}(z)S^*_{x+\Delta x,y}(z)\rangle|^2 + I_0^2 \qquad (4)$$

It is worth mentioning that to derive Eq (4), we only utilized statistical properties of the random variable involved. On the other hand, such statistical property is not related to the physical mechanisms of OCT image formation; and therefore the Eq (4) is applicable to OCT signal.

In the Eq. (4), $|\bullet|^2$ is the square of the amplitude of a complex value. Signal $S_{x,y}(z)$ is determined by the physics of OCT image formation mechanism and can be expressed as the convolution of scattering distribution function $a(x,y,z)$ with system's 3D point spread function (PSF) $P(x,y,z)$ $$S_{x,y}(z) = \int_{x'}\int_{y'}\int_{z'} a(x-x', y-y', z-z')P(x', y', z')dx'\,dy'\,dz'$$

Similarly, OCT signal $S_{x+\Delta x,y}(z)$ can be expressed as $$S_{x+\Delta x,y}(z) = \int\int_{x',y',z'}\int a(x+\Delta x-x', y-y', z-z')P(x', y', z')dx'\,dy'\,dz'$$

It is worth mentioning that $\int$ indicates integration over $(-\infty, +\infty)$ in the expressions of $S_{x,y}(z)$, $S_{x+\Delta x,y}(z)$ and in the following derivations.

Plugging the expression of $S_{x,y}(z)$ and $S_{x+\Delta x,y}(z)$ into Eq (4) and utilizing the fact that OCT system's PSF is not random, we have:

$$\langle I_{x,y}(z)I_{x+\Delta x,y}(z)\rangle =$$

$$\left| \int\int_{x',y',z'}\int \int\int_{x'',y'',z''}\int \langle a(x-x', y-y', z-z')a(x+\Delta x-x'', \right.$$
$$\left. y-y'', z-z'')\rangle P(x', y', z')P^*(x'', y'', z'')dx'\,dy'\,dz'\,dx''\,dy''\,dz'' \right|^2 + I_0^2$$

Assuming that the speckle is fully developed and thus scatterers in different spatial location are described by identical but independent random variables, we have the following relationship:

$$\langle a(x-x',y-y',z-z')a(x+\Delta x-x'',y-y'',z-z'')\rangle =$$
$$a_0^2 \delta(x'+\Delta x<x'')\delta(y'-y'')\delta(z'-z'')$$

In the above equation, $a_0$ is a constant representing the scattering strength. Using the sifting property of delta function, we have $$\langle I_{x,y}(z)I_{x+\Delta x,y}(z)\rangle = \left|\iiint_{x',y',z'}\iiint_{x'',y'',z''} a_0^2 \delta(x'+\Delta x - x'')\delta(y''-y')\delta\right.$$

$$\left.(z''-z')P(x',y',z')P^*(x'',y'',z'')\right.$$

$$\left.dx'\,dy'\,dz'\,dx''\,dy''\,dz''\right|^2 + I_0^2$$

$$= \left|\iiint_{x',y',z'} a_0^2 P(x',y',z')P^*(x'+\Delta x, y', z')\right.$$

$$\left.dx'\,dy'\,dz'\right|^2 + I_0^2$$

In OCT, the axial PSF P(z) and the lateral PSF P(x,y) are separable because axial and lateral PSFs are governed by different physical principles: axial PSF is determined by the temporal coherence of the light source while lateral PSF is determined by the imaging optics in the sample arm. Furthermore, in Gaussian optics model, P(x,y) is the product of PSFs in x and y dimensions. As a result, P(x,y,z) can be written explicitly as $P(x,y,z)=P_x(x)P_y(y)P_z(z)$ and therefore we have:

$$\langle I_{x,y}(z)I_{x+\Delta x,y}(z)\rangle - I_0^2 = \left|a_0^2 \iiint P_x(x')P_y(y')P_z(z')P_x^*\right. \tag{5}$$

$$\left.(x^\dagger + \Delta x)P_y^*(y^\dagger)P_z^*(z')dx'\,dy'\,dz'\right|^2 + I_0^2 - I_0^2$$

$$= \left|a_0^2\left[\int_{-\infty}^{+\infty} P_x(x')P_x^*(x'+\Delta x)dx'\right]\right.$$

$$\left[\int_{-\infty}^{+\infty} P_y(y^\dagger)P_y^*(y')dy'\right]$$

$$\left.\left[\int_{-\infty}^{+\infty} P_z(z')P_z^*(z')dz'\right]\right|^2$$

$$= \left|a_0^2 \int_{-\infty}^{+\infty} P_y(y')P_y^*(y')dy'\right|^2$$

$$\left|\int_{-\infty}^{+\infty} P_z(z')P_z^*(z')dz'\right|^2$$

$$\left|\int_{-\infty}^{+\infty} P_x(x')P_x^*(x'+\Delta x)dx'\right|^2$$

Lateral PSF $P_x(x)$ can be expressed as:

$$P_x(x) = P_0 \exp\left(-\frac{x^2}{w_0^2}\right) \tag{6}$$

In Eq (6), $w_0$ is the Gaussian beam waist of probing beam. It is worth mentioning that Gaussian beam waist in this definition is the distance from the beam axis where the intensity of OCT signal drops to 1/e.

Plugging Eq. (5) into Eq (4), we have:

$$\rho = \frac{\left|a_0^2 \int_{-\infty}^{+\infty} P_y(y')P_y^*(y')dy'\right|^2 \left|\int_{-\infty}^{+\infty} P_z(z')P_z^*(z')dz'\right|^2 \left|\int_{-\infty}^{+\infty} P_x(x')P_x^*(x'+\Delta x)dx'\right|^2}{\left|a_0^2 \int_{-\infty}^{+\infty} P_y(y')P_y^*(y')dy'\right|^2 \left|\int_{-\infty}^{+\infty} P_z(z')P_z^*(z')dz'\right|^2 \left|\int_{-\infty}^{+\infty} P_x(x')P_x^*(x')dx'\right|^2} =$$

$$\frac{\left|\int P_x(x')P_x^*(x'+\Delta x)dx'\right|^2}{\left|\int P_x(x')P_x^*(x')dx'\right|^2}$$

Using the expression of $P_x(x)$ shown as Eq. (6), $\rho$ can be re-written as:

$$\rho = \frac{\left|\int\left[P_0^2 \exp\left(-\frac{x'^2}{w_0^2}\right)\exp\left(-\frac{(x'+\Delta x)^2}{w_0^2}\right)\right]dx'\right|^2}{\left|\int\left[P_0^2 \exp\left(-\frac{x'^2}{w_0^2}\right)\exp\left(-\frac{x'^2}{w_0^2}\right)\right]dx'\right|^2} =$$

$$\frac{\left|\int \exp\left(-\frac{2\left(x'+\frac{\Delta x}{2}\right)^2 + \frac{\Delta x^2}{2}}{w_0^2}\right)dx'\right|^2}{\left|\int \exp\left(-2\frac{x'^2}{w_0^2}\right)dx'\right|^2}$$

We are able to calculate the integration of Gaussian function over $(-\infty, +\infty)$:

$$\int_{-\infty}^{+\infty}\exp\left(-2\frac{x'^2}{w_0^2}\right)dx' = \int_{-\infty}^{+\infty}\exp\left(-\frac{2\left(x'+\frac{\Delta x}{2}\right)^2}{w_0^2}\right)dx = \sqrt{\pi/2}\,w_0$$

Therefore, $$\rho = \frac{\left|\exp\left(-\frac{\Delta x^2}{2w_0^2}\right)\int \exp\left(-\frac{2\left(x'+\frac{\Delta x}{2}\right)^2}{w_0^2}\right)dx'\right|^2}{\left|\int \exp\left(-2\frac{x'^2}{w_0^2}\right)dx'\right|^2} = \tag{7}$$

$$\frac{\left|\exp\left(-\frac{\Delta x^2}{2w_0^2}\right)\sqrt{\pi/2}\,w_0\right|^2}{\left|\sqrt{\pi/2}\,w_0\right|^2} = \exp\left[-\frac{(\Delta x)^2}{w_0^2}\right]$$

Eq (7) shows that the value of $\rho$ is merely determined by $\Delta x$ for fully developed speckle; therefore, we can calculate the cross-correlation coefficient $\rho$ between adjacent A-scans and use the value of $\rho$ to derive the time-varying $\Delta x$ as:

$$\Delta x = w_0 \sqrt{\ln\left(\frac{1}{\rho}\right)} \tag{8}$$

For digitized sample points in A-scans, ρ can be calculated with Eq (9).

$$\rho_{j,j+1} = \frac{\sum_{i=i_f}^{i_l}(I_{ij} - \langle I_j \rangle)(I_{i(j+1)} - \langle I_{(j+1)} \rangle)}{\sqrt{\left[\sum_{i=i_f}^{i_l}(I_{ij} - \langle I_j \rangle)^2\right]\left[\sum_{i=i_f}^{i_l}(I_{i(j+1)} - \langle I_{(j+1)} \rangle)^2\right]}} \quad (9)$$

In Eq (9), i is the index of pixel in an A-scan and j is the index of A-scan. Segmentation of signal between $i_f$ and $i_l$ is selected to calculate ρ.

Theory

For the present example, denote the three dimensional (3D) sample field with reflectivity at time $t_0$ as $r_{s,t0}(x,y,z)$. x is the direction of the lateral scan; z is the axial direction; y is the direction normal to x-z plane. After time Δt, the reflectivity becomes $r_{s,t0+\Delta t}(x,y,z)=r_{s,t0}(x-v_x\Delta t, y-v_y\Delta t, z)$ due to the flow in x-y plane. $v_x$ and $v_y$ indicates flow speed in x and y direction. Continuous OCT signal is the convolution of the 3D object with the system point spread function (PSF), h(x,y,z): $r_{s,t0}(x,y,z)*h(x,y,z)$. Assume an A-scan is obtained at $(x_0, y_0)$ at time $t_0$. Mathematically, it is equivalent to convolving the continuous OCT signal with a Dirac delta function $\delta(x-x_0, y-y_0)$, assuming an ideal sampling. Therefore, $I_{t0}$, A-scan acquired at $t_0$ is:

$$I_{t0}=[r_{s,t0}(x,y,z)*h(x,y,z)]*\delta(x-x_0,y-y_0) \quad (10)$$

Consider $t_0+\Delta t$ as the time when the subsequent Ascan is taken. A-scan acquired at $t_0+\Delta t$ is $r_{s,t0+\Delta t}(x,y,z)*h(x,y,z)*\delta[x-(x_0+\Delta x), y-y_0]$, and $(x_0+\Delta x, y_0)$ is the position of scanning beam at time $t_0+\Delta t$. Therefore, Ascan obtained at $t_0+\Delta t$ can be expressed as:

$$\begin{aligned}I_{t0+\Delta t} &= r_{s,t0}(x-v_x\Delta t, y-v_y\Delta t, z)*h(x,y,z)*\delta \\ & [x-(x_0+\Delta x), y-y_0] \\ &= [r_{s,t0}(x,y,z)*h(x,y,z)]*\delta[x-(x_0+\Delta x+v_x\Delta t), \\ & y-(y_0+v_y\Delta t)]\end{aligned} \quad (11)$$

Eq (10) and (11) imply that taking two A-scans from a flowing object with displacement Δx, is equivalent to taking two A-scans from a static object which can be modeled as $r_{s,t0}(x,y,z)*h(x,y,z)$ with a different displacement ($\Delta x+v_x\Delta t$, $v_y\Delta t$).

In our previous work, as discussed above, we showed that the Pearson cross correlation coefficient (ρ) between Ascans can be used to estimate displacement, according to the following relationship:

$$\rho = \exp\left[-\frac{(\delta x)^2 + (\delta y)^2}{w^2}\right] \quad (12)$$

In Eq (12), δx and δy are displacements between Ascans in x and y; w is the beam waist assuming a Gaussian beam profile. According to Eq (10) and (11), $\delta x=\Delta x+v_x\Delta t$ and $\delta y=v_y\Delta t$.

If the flow is along x axis and $v_y=0$, $v_x$ can be calculated:

$$v_x = \pm\frac{w}{\Delta t}\sqrt{\ln\left(\frac{1}{\rho}\right)} - \frac{\Delta x}{\Delta t} \quad (13)$$

If the flow is along y axis and $v_x=0$, $v_y$ can be calculated:

$$v_y = \pm\frac{1}{\Delta t}\sqrt{w^2\ln\left(\frac{1}{\rho}\right) - \Delta x^2} \quad (14)$$

The plus-minus sign in Eq (13) and (14) causes ambiguity in determine the direction of flow, which is an inherent drawback of speckle method in flow measurement.

Experimental Setup

The configuration of spectral domain OCT (SD OCT) system used in this example has been described previously [5]. Briefly, a superluminescent (SLED) light source centering at 845 nm was used in the OCT system giving an axial resolution of 3.0 μm (in air). A line-scan camera (e2v, EM4, USA) with 70 kHz line rate was interfaced with a home-made spectrometer to record interference spectra. A 300 μm diameter micro channel was fabricated for the phantom experiment. We used a syringe pump to control the speed of bovine milk flowing in the channel. B-scans were obtained at 0.6 μm lateral sampling interval to achieve over-sampling, as the lateral resolution was measured to be 12 μm. To demonstrate that our method can measure flow quantitatively, we used the OCT to scan the micro channel in the direction normal to the flow. In this case, $v_x=0$ and flow speed can be calculated with Eq (14).

Result

B-scan images of the micro channel with flowing milk were obtained at different flow rates. One image of the micro channel is shown in FIG. 2(a). To demonstrate the change of speckle size changes as the flow rate changes, we show the same region of the Bscan (region of interest: 120 μm×96 μm) as the flow rate increased from 0 to 300 μl/min in FIG. 2(b)-(g). It is clear that the speckle size becomes smaller at a larger flow rate. The overall speckle size of the region of interest (ROI) can be evaluated by power spectral density (PSD) of the ROI, as shown in FIG. 3(a)-(f) (logarithm scaled), corresponding to ROIs in FIG. 2(b)-(g). FIG. 3 shows that the width of PSD in lateral direction increases as flow rate, indicating that quantitative flow information might be extracted from speckle analysis in lateral direction.

To extract quantitative flow information from the OCT images, we calculated ρ using adjacent A-scans at different lateral locations. As shown in FIG. 4(a), outside the channel, A-scan images are merely noise because no reflected/scattered photons were detected; therefore, these A-scans are decorrelated and therefore correspond to a very small value of ρ. Within the micro channel, OCT images were generated by backscattered photons due to the flowing scatterers and therefore carry information about the flow. As shown in FIG. 4(a), the value of ρ at the same lateral location within the channel increases with the flow rate; for a given flow rate, ρ has a smaller value at the center part of the channel, indicating a larger flow velocity. This is consistent with the fact the flow speed has a parabolic profile within such a circular micro channel. In FIG. 4(b), we show the value of ρ calculated from A-scans in the central part of the channel, at different pump rates. The decrease of ρ with increasing pump rate can be clearly observed in FIG. 4(b). Using the pump rate (R) and the area of the micro channel cross section (S), we can deduce the flow speed $v_y$: $v_y=R/S$ and also the displacement: $\Delta y=v_y\Delta t$. Furthermore, we can calculate $\Delta y$ using the cross correlation coefficient using Eq (14). For a certain flow rate, different lateral locations correspond to the different value of ρ and therefore different flow speed. The average of the calculated flow speeds is obtained and shown as red circles in FIG. 4(c). For comparison, it also shows $\Delta y$ calculated using flow rate and the area of the channel, as the black line in FIG. 4(c). The error between the actual and calculated is quite small below $V_T<2$ microns however the error increases with the decorrelation increases.

Discussion

For the proposed flow measurement to work, it requires each A-scan obtained with an exposure time much shorter than the speckle decorrelation time. Thereby speckle features within each A-scan is well preserved. In addition, it also requires the displacement due to the scanning or the flow to be comparable with the speckle decorrelation length. As shown in our previous work, from numerical simulation as well as experimental results, over-sampling is essential to obtain accurate estimation of displacement using speckle decorrelation; therefore, in this study we performed lateral sampling at 0.6 μm while the lateral resolution of our OCT system is 12 μm. However, as the flow velocity increases the higher rate of oversampling is required.

In deriving the mathematical foundation of this example, it is assumed that the speckle is fully developed. However, most OCT images using real specimens have partially developed speckle instead of fully developed speckle. For most highly scattering samples, it is usually reasonable to assume that the scatterers have a homogeneous distribution with a uniform scattering strength underneath the sample surface. Although areas corresponding to sample boundary do no satisfy the fully developed speckle requirement, they take only a few pixels and therefore do not contribute significantly in the calculation of XCC. As a result, the equations used in this example are valid for highly scattering specimens, even if they do not stringently have a fully developed speckle.

REFERENCES

[1] Zhongping Chen, Thomas E. Milner, Shyam Srinivas, Xiaojun Wang, Arash Malekafzali, Martin J. C. van Gemert, and J. Stuart Nelson, "Noninvasive imaging of in vivo blood flow velocity using optical Doppler tomography," Opt. Lett. 22, 1119-1121 (1997)

[2] Adrian Mariampillai, Beau A. Standish, Eduardo H. Moriyama, Mamta Khurana, Nigel R. Munce, Michael K. K. Leung, James Jiang, Alex Cable, Brian C. Wilson, I. Alex Vitkin, and Victor X. D. Yang, "Speckle variance detection of microvasculature using swept-source optical coherence tomography," Opt. Lett. 33, 1530-1532 (2008)

[3] Hugang Ren, Congwu Du, and Yingtian Pan, "Cerebral blood flow imaged with ultrahigh-resolution optical coherence angiography and Doppler tomography," Opt. Lett. 37, 1388-1390 (2012)

[4] Xuan Liu, Yong Huang, and Jin U. Kang, "Distortion-free freehand-scanning OCT implemented with real-time scanning speed variance correction," Opt. Express 20, 16567-16583 (2012)

[5] Xuan Liu, Kang Zhang, Yong Huang, and Jin U. Kang, "Spectroscopic-speckle variance OCT for microvasculature detection and analysis," Biomed. Opt. Express 2, 2995-3009 (2011)

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without deputing from the invention, as appreciated by those skilled in the art in light of the above teachings. It is therefore to be understood that, within the scope of the claims and their equivalents, the invention may be practiced otherwise than as specifically described.

We claim:

1. A system for assessing the flow of a fluid, comprising:
a light source;
a fiber-optic system optically coupled to said light source, said fiber-optic system arranged to provide a reference beam and an observation beam;
an optical detection system arranged to receive combined light from said reference beam and said observation beam, said optical detection system providing detection signals; and
a data processing system arranged to communicate with said optical detection system to receive said detection signals;
wherein said data processing system is configured to use the detection signals to determine a plurality of speckle patterns, wherein each speckle pattern of the plurality of speckle patterns corresponds to one of a plurality of A-scans, and to calculate a correlation between speckle patterns corresponding to adjacent A-scans of said plurality of A-scans perpendicular to the flow to determine at least one of a rate of the flow and a displacement of the flow.

2. The system of claim 1, wherein the direction of said flow occurs in a plane that is normal to the observation beam.

3. The system of claim 1, wherein said speckle pattern is caused by photons which are backscattered by flowing scatterers within the fluid.

4. The system of claim 1, wherein said fiber optic system is arranged to provide said reference beam and observation beam along separate fiber optic paths.

5. The system of claim 1, wherein said fiber optic system is arranged to provide said reference beam and observation beam along a single common fiber optic path.

6. The system of claim 1, wherein the position corresponding to a first speckle pattern of said plurality of speckle patterns and the position corresponding to a second speckle pattern of said plurality of speckle patterns are different lateral locations within the flow.

7. A system for assessing the flow of a fluid, comprising:
a light source;
a fiber-optic system optically coupled to said light source, said fiber-optic system arranged to provide a reference beam and an observation beam;
an optical detection system arranged to receive combined light from said reference beam and said observation beam, said optical detection system providing detection signals; and
a data processing system arranged to communicate with said optical detection system to receive said detection signals;
wherein said data processing system is configured to use the detection signals to determine a speckle pattern corresponding to the fluid flow, wherein the speckle pattern includes a plurality of lines, and to calculate a correlation between adjacent lines perpendicular to the flow to determine at least one of a rate of the flow and a displacement of the flow, wherein the position corresponding to a first line of said plurality of lines and the position corresponding to said second line of said plurality of lines are different lateral locations within the flow, and wherein said different lateral locations are spaced so that the distance between said different lateral locations is smaller than the lateral resolution of the system.

8. The system of claim 7, wherein the distance between said different lateral locations is approximately 0.6 µm, and the lateral resolution of the system is approximately 12 µm.

9. A system for assessing the flow of a fluid, comprising:
a light source;
a fiber-optic system optically coupled to said light source, said fiber-optic system arranged to provide a reference beam and an observation beam;
an optical detection system arranged to receive combined light from said reference beam and said observation beam, said optical detection system providing detection signals; and
a data processing system arranged to communicate with said optical detection system to receive said detection signals;
wherein said data processing system is configured to use the detection signals to determine a speckle pattern corresponding to the fluid flow, wherein the speckle pattern includes a plurality of lines, and to calculate a correlation between adjacent lines perpendicular to the flow to determine at least one of a rate of the flow and a displacement of the flow, and
wherein said correlation is calculated using the Pearson cross-correlation coefficient.

10. The system of claim 9, wherein a decrease in the Pearson cross-correlation coefficient indicates an increase in the rate of the flow of the fluid.

11. A method for assessing the flow of a fluid, comprising:
obtaining a plurality of speckle patterns using light interferometry, wherein each speckle pattern of the plurality of speckle patterns corresponds to one of a plurality of A-scans;
calculating a correlation between speckle patterns corresponding to adjacent A-scans of said plurality of A-scans; and
determining at least one of a rate of the flow and a displacement of the flow.

12. The method of claim 11 wherein the direction of said flow occurs in a plane that is normal to the observation beam.

13. The method of claim 11, wherein said speckle pattern is caused by photons which are backscattered by flowing scatterers within the fluid.

14. The method of claim 11, wherein said speckle pattern is obtained using optical coherence tomography.

15. The method of claim 11, wherein the position corresponding to each of the plurality of lines in said speckle pattern is a different lateral location within the flow.

16. A method for assessing the flow of a fluid, comprising;
obtaining a speckle pattern corresponding to the flow using light interferometry, wherein the speckle pattern includes a plurality of lines;
calculating a correlation between said adjacent lines of the speckle pattern; and
determining at least one of a rate of the flow and a displacement of the flow;
wherein the position corresponding to each of the plurality of lines in said speckle pattern is a different lateral location within the flow, and
wherein said different lateral locations are spaced so that the distance between said lateral locations is smaller than the lateral resolution of the system.

17. The method of claim 16, wherein the distance between said lateral locations is approximately 0.6 µm, and the lateral resolution of the system is approximately 12 µm.

18. A method for assessing the flow of a fluid, comprising;
obtaining a speckle pattern corresponding to the flow using light interferometry, wherein the speckle pattern includes a plurality of lines;
calculating a correlation between said adjacent lines of the speckle pattern; and
determining at least one of a rate of the flow and a displacement of the flow;
wherein said correlation in intensity is calculated using the Pearson cross-correlation coefficient.

19. The method of claim 18, wherein a decrease in the Pearson cross-correlation coefficient indicates an increase in the rate of the flow of the fluid.

* * * * *